(12) United States Patent
Karout et al.

(10) Patent No.: US 12,484,034 B2
(45) Date of Patent: Nov. 25, 2025

(54) RESOURCE SHARING FOR COOPERATIVE COMMUNICATIONS

(71) Applicant: Telefonaktiebolaget LM Ericsson (publ), Stockholm (SE)

(72) Inventors: Johnny Karout, Täby (SE); Hamed Farhadi, Stockholm (SE); Gabor Fodor, Hässelby (SE); Maksym Girnyk, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 454 days.

(21) Appl. No.: 17/918,667

(22) PCT Filed: Apr. 17, 2020

(86) PCT No.: PCT/SE2020/050394
§ 371 (c)(1),
(2) Date: Oct. 13, 2022

(87) PCT Pub. No.: WO2021/211027
PCT Pub. Date: Oct. 21, 2021

(65) Prior Publication Data
US 2023/0345437 A1 Oct. 26, 2023

(51) Int. Cl.
*H04W 72/0453* (2023.01)
*H04L 9/32* (2006.01)
*H04W 72/20* (2023.01)

(52) U.S. Cl.
CPC ....... *H04W 72/0453* (2013.01); *H04L 9/3236* (2013.01); *H04W 72/20* (2023.01)

(58) Field of Classification Search
CPC .......... H04W 72/0453; H04W 72/20; H04L 9/3236; H04L 9/50; H04L 9/3239; H04L 9/3247; H04L 9/0825
See application file for complete search history.

(56) References Cited

U.S. PATENT DOCUMENTS 12,072,991 B2 * 8/2024 Shrinivasan .......... H04L 9/3239
12,113,781 B2 * 10/2024 Gadnis .................. G06Q 50/10
(Continued)

OTHER PUBLICATIONS

European Search Report and Written Opinion dated Nov. 27, 2023 for Application No. 20931202.4, consisting of 11 pages.
(Continued)

*Primary Examiner* — Chandrahas B Patel
(74) *Attorney, Agent, or Firm* — Weisberg I.P. Law. P.A.

(57) ABSTRACT

A method of operating a first wireless communication device includes transmitting a first message toward one or more wireless devices including a second wireless device, the first message indicating a need of the first wireless communication device to use shared network resources, receiving an indication from the second wireless device that it has available resources, utilizing the available resources of the second wireless device, transmitting a second message toward the one or more wireless devices, the second message comprising an entry for inclusion in a distributed transaction ledger of utilized resources that is shared among the one or more wireless devices, the entry indicating utilization of the available resources of the second wireless device by the first wireless communication device, and storing the entry in a local copy of the distributed transaction ledger.

19 Claims, 20 Drawing Sheets

(56) References Cited

U.S. PATENT DOCUMENTS

2017/0127409 A1 5/2017 Mishra et al.
2020/0100259 A1 3/2020 Tanaka
2024/0248966 A1* 7/2024 Wright .................. H04L 9/0841

OTHER PUBLICATIONS

Zhou, et al. "Blockchain-Empowered Secure Spectrum Sharing for 5G Heterogenous Networks"; Blockchains for Scalable IOT Management, Access, and Accountability; IEEE Network Jan./Feb. 2020, consisting of 8 pages.

Erkip, E., et al., Cooperative Communication in Wireless Systems; Advances in network information theory; Aug. 2004; pp. 303-320; Publication Series: AMS DIMACS Series; consisting of 18 pages.

International Search Report and Written Opinion dated Feb. 22, 2021 for International Application No. PCT/SE2020/050394 filed Apr. 17, 2020; consisting of 15 pages.

Ling, X., et al.; Blockchain Radio Access Network (B-RAN): Towards Decentralized Secure Radio Access Paradigm; EEE Access; Open Access Journal; Jan. 1, 2019; pp. 9714-9723; vol. 7; consisting of 10 pages.

Zanzi, L., et al.; NSBchain: A Secure Blockchain Framework for Network Slicing Brokerage; arXiv:2003.07748v1; Mar. 17, 2020; consisting of 7 pages.

Zhou, A., et al.; BCEdge: Blockchain-based resource management in D2D- assisted mobile edge computing; Softw: Pract Exper., 2019, Apr. 6, 2019; pp. 1-18; John Wiley & Sons, Ltd .; consisting of 18 pages.

* cited by examiner

RESOURCE SHARING FOR COOPERATIVE COMMUNICATIONS

CROSS-REFERENCE TO RELATED APPLICATIONS

This application is a Submission Under 35 U.S.C. § 371 for U.S. National Stage Patent Application of International Application Number: PCT/SE2020/050394, filed Apr. 17, 2020 entitled "RESOURCE SHARING FOR COOPERATIVE COMMUNICATIONS," the entirety of which is incorporated herein by reference.

TECHNICAL FIELD

The present disclosure relates generally to communications, and more particularly, to wireless communications and related wireless devices and network nodes.

BACKGROUND

In a wireless communication network, many resources that are used for communications, such as bandwidth resources, time/frequency resources, orthogonal codes, processing resources, etc., are provisioned based on expected loads to provide a desired level of service, such as 99% availability. In practice, this means that many resources are provisioned at a level that is greater than the average load requirements. Accordingly, many communication resources may not always be fully utilized, meaning that a network may at any given time have excess resources. Efforts have been made to increase the utilization of unused resources. One such approach is known as cooperative communication. Cooperative communication techniques refer to methods that enable a wireless node to assist the communication of the other terminals in a wireless network by making its communication resources, such as bandwidth resources, time/frequency resources, orthogonal codes, processing resources, etc., available for use by other terminals in the network. Cooperative communication may improve network performance by increasing the diversity of communication over fading channels, extending network coverage, and enhancing spectral efficiency, among other benefits.

FIG. 1A illustrates a relay network which is composed of three nodes, namely, a source node 110 (e.g. base station), a destination node 100 (e.g. UE or IoT device), and a relay node 120 (e.g. integrated access backhaul (IAB) node, or another UE or IOT device). The network shown in FIG. 1A is a representative example of a cooperative network. The relay node 120 can assist the communication of the source-destination pair by several exemplary coding schemes including amplify-and-forward, decode-and-forward, compress-and-forward, and compute-and-forward. The relay node 120 receives a signal from the source node 110, processes the received signal according to one of these coding schemes and transmits a signal to the destination node 100. The destination node 100 processes the received signal from the source node 110 and the relay node 120 and tries to decode the transmitted messages. The cooperative communication techniques require a terminal to use part of its radio and processing resources (e.g. energy, spectrum, power) to assist other terminals' communications. A broad range of cooperative communication schemes based on cooperative and non-cooperative game theoretic results are possible.

SUMMARY

A method of operating a first wireless communication device in a communication network includes transmitting a first message toward a plurality of wireless devices, the first message indicating a need of the first wireless communication device to use shared network resources, receiving an indication from a second wireless device that it has available resources, utilizing the available resources of the second wireless device, transmitting a second message toward the plurality of wireless devices, the second message comprising an entry for inclusion in a distributed transaction ledger of utilized resources that is shared among the plurality of wireless devices, the entry indicating utilization of the available resources of the second wireless device by the first wireless communication device, and storing the entry in a local copy of the distributed transaction ledger.

Some embodiments provide a method that includes receiving a first message from a first wireless device indicating a need of the first wireless device to use shared network resources, transmitting a message to the first wireless device indicating that the second wireless has available resources, providing the available resources to the first wireless device, receiving a second message from the first wireless device, the second message comprising an entry for inclusion in a distributed transaction ledger of utilized resources that is shared among a plurality of wireless devices, the entry indicating utilization of the available resources of the second wireless device by the first wireless device, and storing the entry in a local copy of the distributed transaction ledger.

A method performed by a wireless device that participates in cooperative communication system according to further embodiments includes receiving a first message from a first wireless device indicating a need of the first wireless device to use shared network resources, receiving a second message from the first wireless device, the second message comprising an entry for inclusion in a distributed transaction ledger of utilized resources that is shared among a plurality of wireless devices, the entry indicating utilization of resources of a second wireless device by the first wireless device, and storing the entry in a local copy of the distributed transaction ledger.

Further embodiments provide a communication device and a computer program product adapted to perform the foregoing methods.

Some embodiments may advantageously facilitate cooperative communication among devices in a communication network by keeping track of the sharing of resources in a distributed transaction ledger.

DETAILED DESCRIPTION

Figure 1A:
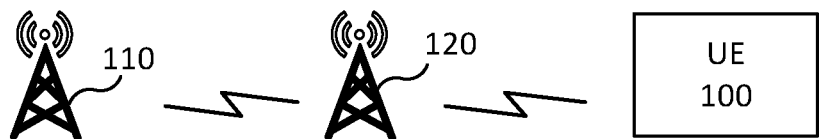
FIG. 1A illustrates a wireless communication system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In the context of the Internet of Things (IoT) or Machine Type Communications (MTC) where many devices communicate in a wireless network, the capacity of the network may be limited due to the limited internal resources of the devices (such as energy, processing capacity, memory) and external resources available to the devices (such as wireless spectrum, uplink/downlink/sidelink channel, etc.). Using cooperative communications, devices that require less resources can share part of their available internal/external resources for assisting the communication of other terminals, such as by relaying the other terminals' messages. In such networks, not only can cooperation between terminals improve the network performance in terms of throughput, capacity, coverage and other parameters, but the cooperating terminals can also increase their individual performance, such as by increasing their effective transmission rates, throughput, etc.

Accordingly, cooperative communications can be used to increase resource utilization in a network. Cooperative communication can also be used to improve network performance by providing extra resources to network nodes on demand. When such resources are provided by network nodes, the network can keep track of what resources are used and which nodes are using them, and can track, manage and bill for such services as needed. Cooperative communications can also involve the provision of network resources on a peer-to-peer basis, however. For example, one UE or IoT device may provide internal or external resources, such as bandwidth, channel, processing, memory or other resources, to another UE or IoT device on a peer-to-peer basis. In that case, it may be difficult to keep track of what resources are needed, what resources are offered, and what resources are actually used.

There is also a need to incentivize devices to provide resources to other peer devices, since the use of such resources may incur a cost by the donor device, such as power or battery usage, in sharing resources with a recipient device. That is, for peer-to-peer cooperation to be effective, there should be a mechanism in place to incentivize cooperation, such as by providing a reward to devices that share their resources. Otherwise, devices with extra available resources may refuse to assist other terminals in the network. Such refusal to share would defeat the purpose of cooperative communications and degrade the potential performance of the network. In addition, a mechanism to track the exchange of different types of resources between terminals is needed.

Accordingly, some embodiments provide systems/methods that can keep track of the use of resources that are cooperatively shared in a wireless communication network, in particular, for resources shared by peer devices in a wireless communication network. Some further embodiments provide systems/methods that can compensate a device for sharing resources in a wireless communication network.

According to some embodiments, the resources (e.g. internal resources such as energy, memory, processing capacity, and external resources such as spectrum) at each device may be treated as assets that can be used by the device to either transmit its own communications or assist transmissions by other devices. Devices coordinate with each other to establish cooperation as needed. Transactions may be recorded on a decentralized transaction ledger (DTL), such as a blockchain.

A blockchain is a list of records (called blocks) that are linked with help of cryptographic hash, making it resistant to modifications. The inherent integrity of blockchains makes blockchain a good technology for a decentralized ledger that records transactions in a network, making them verifiable and permanent. As transactions are executed in the network, blocks are added to the blockchain. The longer the list, the harder it is to modify.

Using blockchain technology, participants in the network can confirm transactions, potentially without the need for a trusted third party or centralized intermediary. A DTL provides an open and distributed ledger that can record transactions between two parties efficiently and in a verifiable and permanent way. A blockchain is typically managed by a peer-to-peer network that collectively adheres to a protocol for validating new records/blocks. Once recorded, the data in any given block may be substantially protected from retroactive alteration without alteration of all subsequent blocks due to the requirement of collusion of the network majority.

Once a device uses its internal or external resources for assisting another device, the sharing/use of resources is recorded on DTL. The DTL may be shared by and/or accessible to each of the participating devices in the cooperative communication network. The DTL may have a structure similar to a blockchain, in that transactions may be grouped together in a block along with an identifier of a previous block (such as a hash value associated with the previous block), and a hash value of the block may be stored along with the block. The block may be added to the DTL. Because the block is linked to previous blocks through their respective hashes, modifications or alterations of previous blocks in the DTL may be easily detectable by any network participant. Moreover, by recording the transaction in the DTL, other devices can verify details of the transaction, such as the type and the amount of the exchanged resource. In this way, devices can more efficiently use shared resources while the cooperative devices can be incentivized for the resources that they have shared. Some embodiments provide mechanisms for signaling that is needed for requesting/providing resources and verifying and publishing the transactions.

Accordingly, some embodiments may enable and encourage devices to cooperate by keeping track of the resources that they share. Some embodiments may improve network performance aspects, such as coverage, lifetime, throughput, reliability, etc., in terms of increasing the life time of devices with poor channel conditions, increasing network throughput by allocating the resources to where in the network the resources are needed, and/or increasing the reliability by exploiting channel diversity to mitigate channel fading.

Systems/methods according to some embodiments may keep track of resources that devices share/borrow from other devices. This information can be subsequently used for the maintenance of the network and identifying possible adjustments that may be needed to improve connectivity for a given device in the network.

Systems/methods according to some embodiments may keep track of different type of resources that are exchanged between devices. This information together with the pricing policy for resources can be used to track the credit balance of devices in the network.

A network consists of multiple devices that can be divided in two groups, sources and destinations. Each source device intends to communicate to a destination device. There are limited resources available at each source for communicating its messages. From the point of view of the devices, there are two types of resources available at each source for establishing communications: internal resources (e.g. battery, processing capacity, memory, etc.), and external resources (e.g. spectrum, in the form of uplink/downlink/ sidelink resources). Each source may partition its internal and external resources in two parts: one part that is needed to support its own communication requirements and another part that can be used for assisting other sources.

Figure 1B:
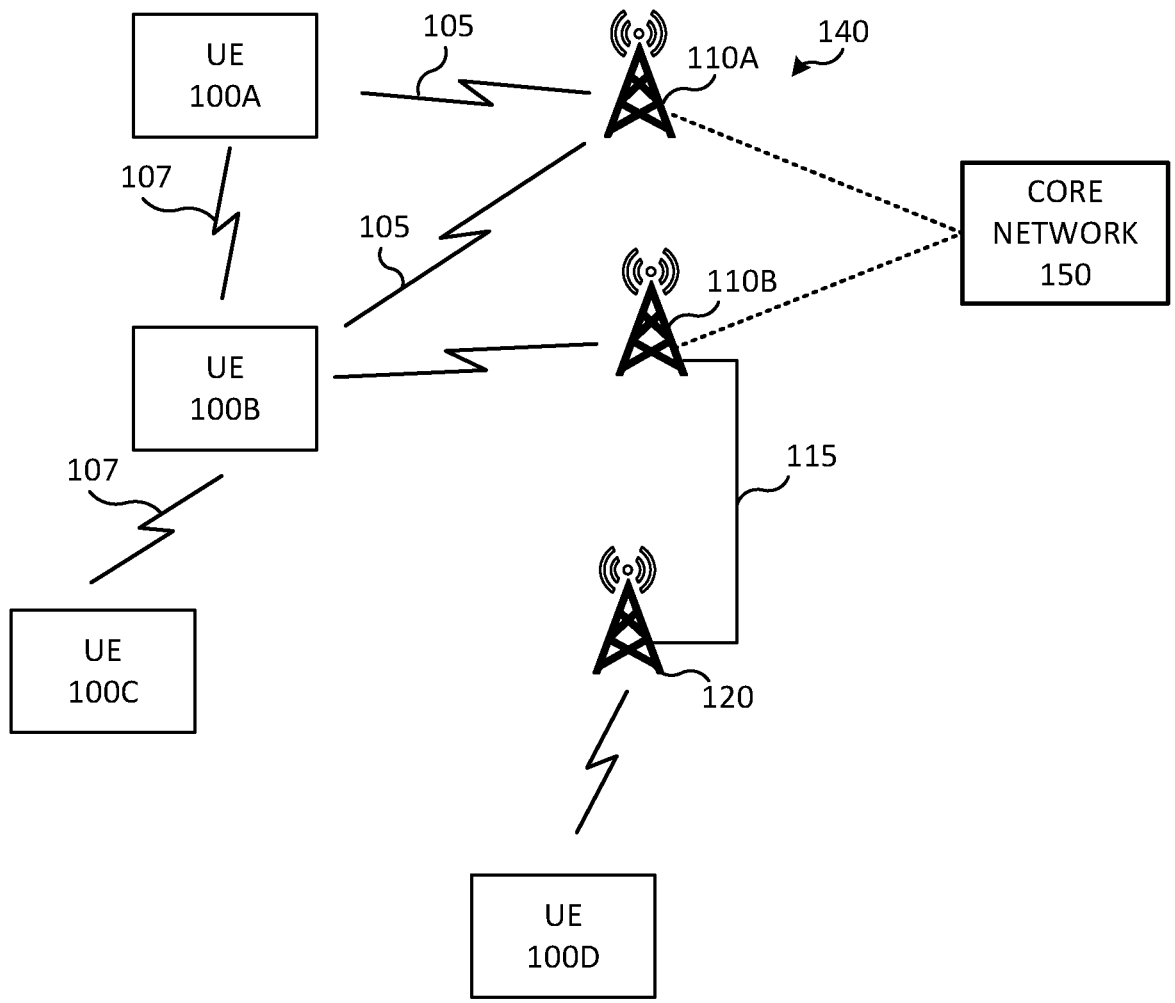
FIG. 1B illustrates a wireless communication system in which some embodiments of the inventive concepts may be implemented.

FIG. 1B is schematic illustration of a network in which cooperative communications can be implemented. The network shown in FIG. 1B includes a radio access network 140 including base station nodes (such as gNBs) 110A, 110B, and a relay node 120 connected to a base station 110B via a wired or wireless backhaul link 115. The RAN 140 is connected to a core network 150 that provides management, billing, control, connectivity, mobility and other services. The RAN 140 provides wireless communication services to one or more user equipment devices (UEs) 100A to 100D. The UEs 100A-100D may be connected to the RAN 140 via uplink/downlink connections. Some UEs may support sidelink connections 107 to other UEs. Resources in the network may be shared by the UEs. For example, if UE 100C needs to send a communication to base station 110A but does not have a direct uplink connection to the base station 110A, the UE 100C may request that UE 100B transmit the communication to base station 110A on its behalf via its uplink connection 105.

Figure 2:
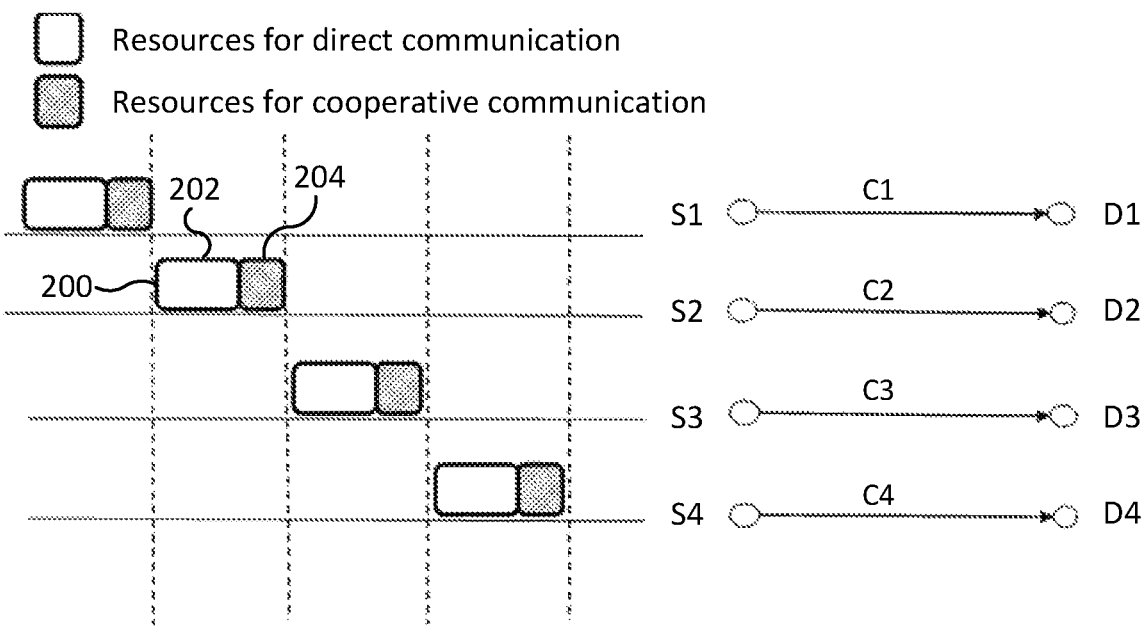
FIG. 2 illustrates transmissions by devices engaging in cooperative communications in accordance with some embodiments of the inventive concepts.

FIG. 2 is a schematic diagram illustrates communication by multiple source devices S1-S4 over orthogonal resource blocks (e.g. time slots, frequency bands, spreading codes, etc.) in a cooperative network. In FIG. 2, each source device S1-S2 transmits/receives signals to/from a respective destination device D1-D4 over a respective channel C1-C4. The channels C1-C4 may be orthogonal in frequency/time. Accordingly, each source device S1-S4 has an associated resource block 500 available to it. The resource blocks 200 shown in FIG. 2 represent both internal and external resources available to each source device S1-S4. Moreover, each resource block 200 is divided into a first set of resources 202 used for its own communications and a second set of resources 204 that are available to use for shared/cooperative communications, i.e., to share with other devices. Each source device S1-S4 with its respective destination device D1-D4. The radio resources at each source are divided into two parts, one part for the communication of its messages to the intended destination, and the other part for assisting the other devices.

Figure 3:
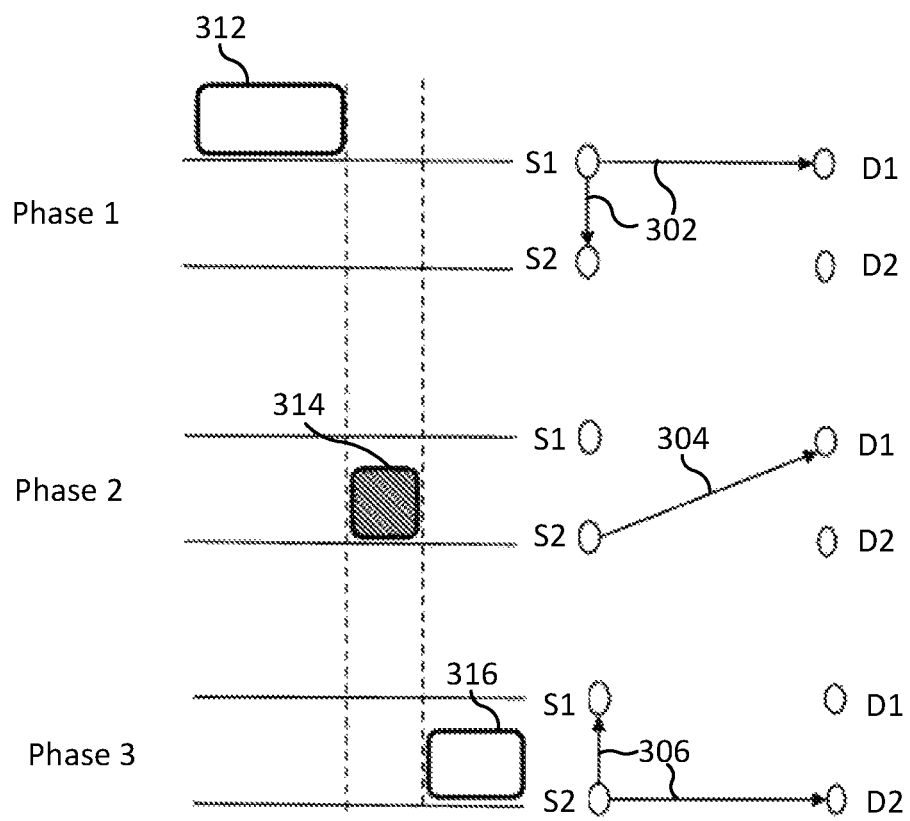
FIG. 3 illustrates sharing of resources by devices engaging in cooperative communications in accordance with some embodiments of the inventive concepts.

Different phases of cooperative communication are illustrated in FIG. 3 for a sample network in which two source-destination pairs are communicating. The same principle applies to larger networks as well. In this network, communication is performed in three phases as follows. In Phase 1, device S1 broadcasts a signal 302 containing its message to device D1 using part of its internal and external resources 312. Both devices D1 and S2 receive the signal transmitted by S1. Device D1 tries to decode the transmitted message.

In Phase 2, device S2 assists the communication of S1 to D1, for example, by using part of its internal resources as shared resources for the processing of the signal 302 received in Phase 1, and by using part of its external and internal resources as shared resources 314 for transmitting a signal 304 to D1. The processing performed by S2 may include, for example, decoding (decode and forward relaying), amplification (amplify and forward relaying), and/or compression (compress and forward relaying) of the signal 302 received in Phase 1. The device D1 tries to decode the transmitted messages from the received signals 302, 304 from S1 and S2 during both transmission phases. The reception of the signal from device S1 may be improved at device D1 by combining the version of the signal received from device S1 with the version of the signal received from device S2 through, for example, soft combining.

In Phase 3, device S2 broadcasts a signal 306 containing its message to D2 using part of its internal and external resources 316. Destination device D2 and source device S1 receive the signal 306 transmitted by S2. Device D2 tries to decode its message. In case other devices assist the S2-D2 communication, device D2 may use further received signals to refine/improve its decoding.

Figure 4:
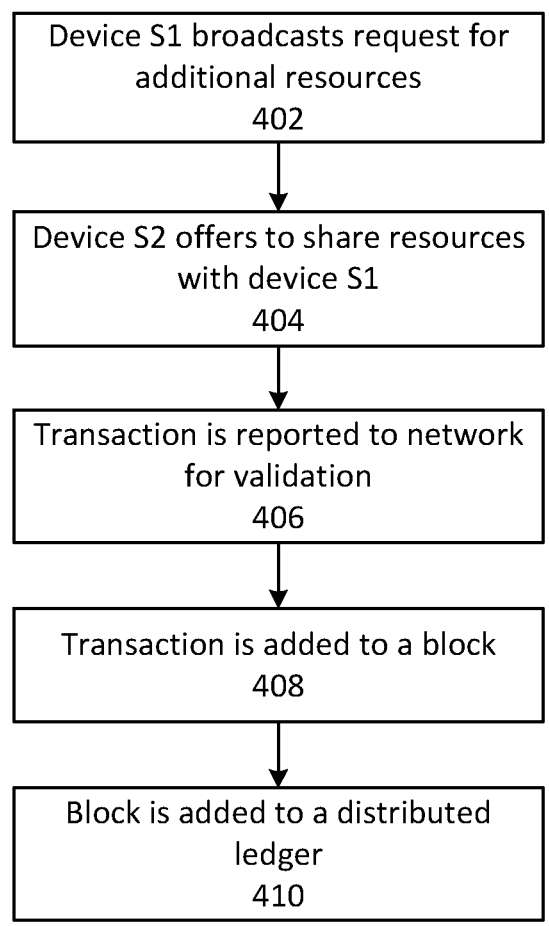
FIG. 4 is a flowchart that illustrates operations of devices engaging in cooperative communications in accordance with some embodiments of the inventive concepts.

A procedure for requesting, assigning, and using radio resources for cooperating communication using a distributed ledger according to some embodiments is illustrated in FIG. 4. As shown therein, a device, referred to as a requesting device (e.g. a base station in cellular network, a sensor node in IoT network, or a UE in cellular network with device-to-device communication capability, or nodes in integrated access backhaul (IAB) scenarios, etc.) that requires extra resources from one or more other devices broadcasts a request for resources (block 402). The request may specify the type and amount of resources needed.

A device, referred to as a donor device, that has extra resources of the type required by the requesting device and is willing to assist the requesting device acknowledges the request and offers to share its resources with the requesting device (block 404). The transaction is reported to other network of devices (block 406), which validate the transaction between the requesting and donor devices. The other devices may check/estimate the status of available resources at the requesting and donor devices.

The use of internal resources of a donor device implies that the donor device uses part of its internal resource to assist another device, and the use of external resources of the donor device implies that the donor device hands over permission to use part of its external resources (e.g. spectrum) to the requesting device and/or that the donor device uses its external resources on behalf of the requesting device.

Once the transaction of resources is performed (in the form of a device assisting another device in its communications), a transaction record is added to a block (block 408). The transaction record may include the type and the amount of resources that were provided by the donor device. The block is then appended to the distributed transaction ledger (block 410), extending the existing distributed transaction ledger with a new block. Due the consensus-based verification mechanism of the transactions, such extension is difficult to alter without corrupting all subsequent blocks. All devices in the network may store a copy of the entire digital transaction ledger, a portion thereof or a digest thereof.

The computation load associated with maintaining the digital transaction ledger may depend on the resource exchange rate between devices in the network, which is related to the amount of cooperation among devices. There is no need for continuous logging in the network. For example, in networks in which only limited cooperation between devices is needed, there may be limited resource transactions and thus the overhead of the companions would be limited.

Embodiments described herein may be applicable to fixed and/or wireless networks, including ad-hoc wireless networks. In fixed networks, the record keeping associated with the radio/processing resource exchange can be performed over a backhaul network (as an alternative centralized approach), while in ad-hoc networks there is a greater benefit to have distributed record keeping as described above.

Figure 5A:
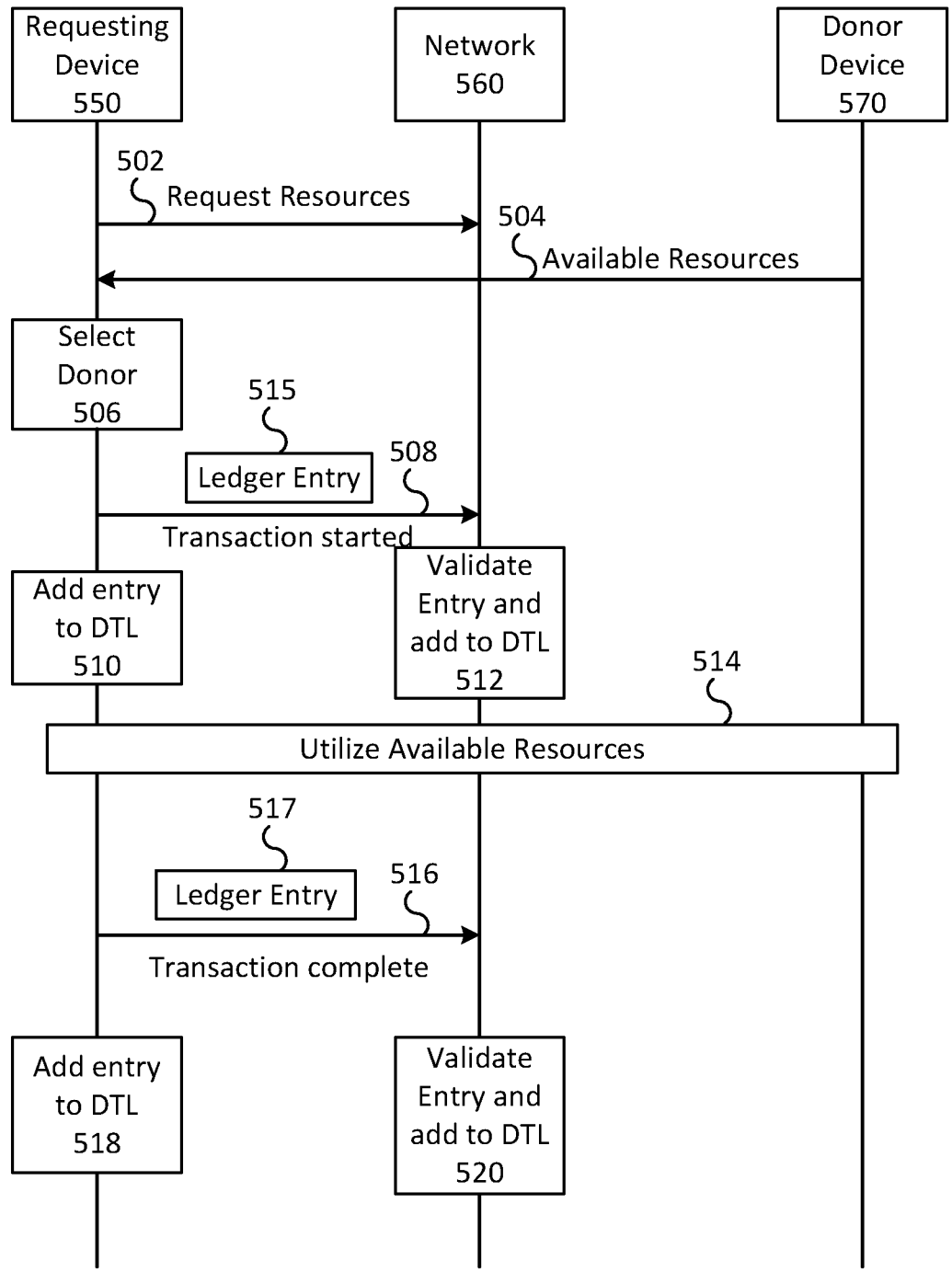
FIGS. 5A and 5B illustrate message flows and operations in accordance with some embodiments of the inventive concepts.

FIG. 5A illustrates operations according to some embodiments. FIG. 5A illustrates a requesting device 550, a network 560 and a donor device 570. The requesting device 550 and donor device 550 may be any wired or wireless network device that participates in cooperative communication, and may include network nodes, UEs, IoT devices, etc. Such devices are generally referred to herein as "participating devices." The network 560 generally refers to all participating devices other than the requesting device 550 and the donor device 570.

Referring to FIG. 5A, a requesting device that needs to obtain shared resources from another device in the network transmits a request 502 for resources to one or more other devices in the network 560. One or more potential donor devices 570 may respond to the request with an acknowledgement 504 offering to share resources with the requesting device. The acknowledgement 504 may include a description of available resources at the donor device 570.

The requesting device 550 then selects a donor device 570 from among the responding donor devices (block 506). The requesting device 550 may then transmit a message 508 to the network indicating the transaction has started. The message 508 may include a ledger entry 515, or transaction, for inclusion in a distributed transaction ledger (DTL). The ledger entry 515 may identify the requesting device 550, the selected donor device 570 and the requested resources. The requesting device 550 may then add the ledger entry to the DTL (block 550). Likewise, the participating devices in the network 560 may validate the ledger entry 515 and add the ledger entry 515 to the DTL (block 512).

The requesting device 550 then uses the resources made available by the donor device 570 (block 514).

Once the requesting device 550 has finished using the resources provided by the donor device 570, the requesting device 550 transmits a message 516 to the network 560 indicating that the transaction is complete. The message 516 includes a second ledger entry 517 identifying the requesting device 550, the donor device 570 and the shared resources. The requesting device 550 adds the ledger entry to the DTL (block 518), and the participating devices in the network 560 validate the ledger entry and add it to the DTL (block 520).

To incentive potential donor devices to share resources, some systems/methods may provide the ability to transfer digital tokens to donor devices in return for resources. The digital tokens may represent value. In particular, the message 502 requesting resources may identify a quantity of a payment token that is offered in exchange for providing the shared network resources that are requested, and the ledger entry 517 may transfer the quantity of the payment token to the donor device 570 once the transaction has been completed.

Figure 5B:
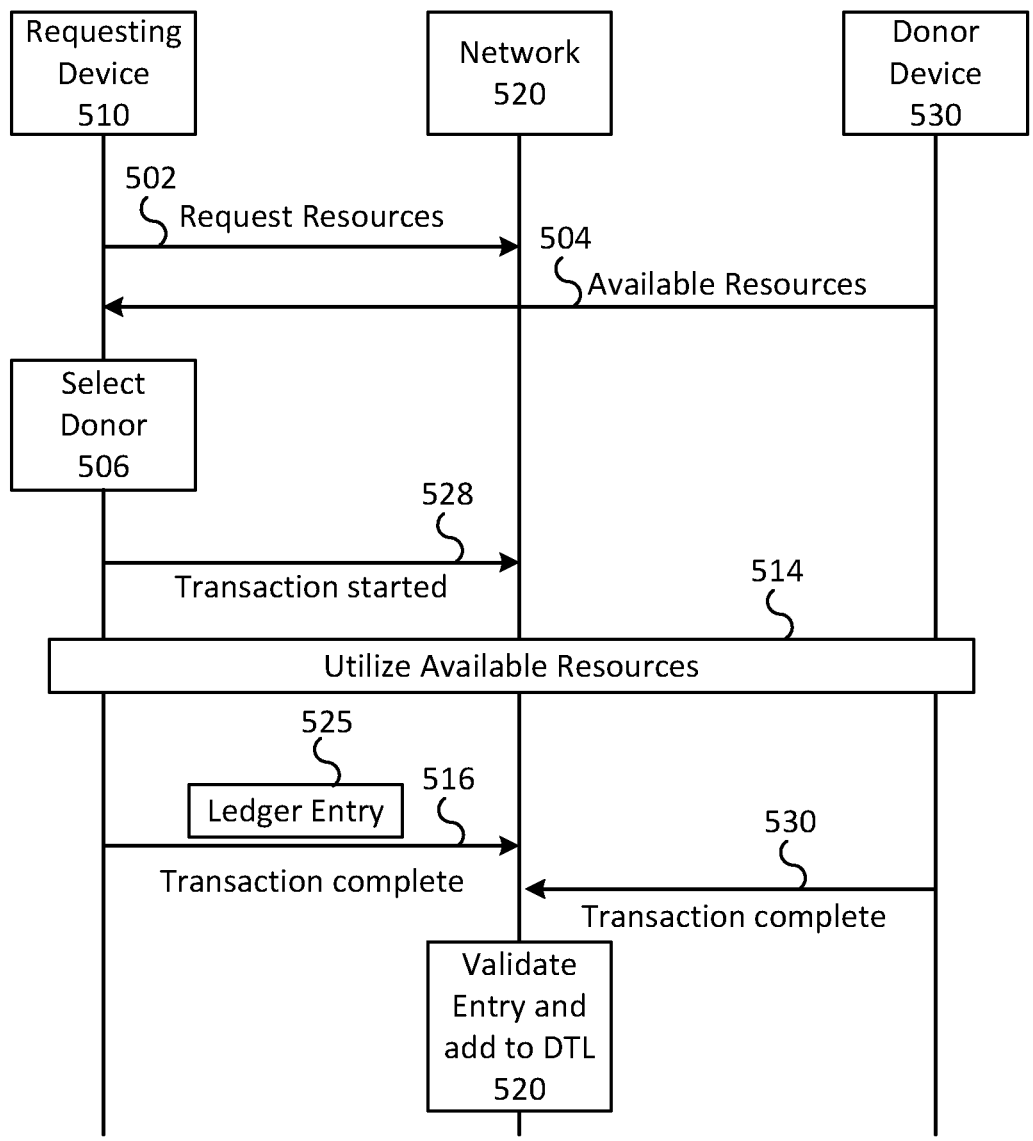

FIG. 5B illustrates operations according to further embodiments. Referring to FIG. 5A, a requesting device that needs to obtain shared resources from another device in the network transmits a request 502 for resources to one or more other devices in the network 560. One or more potential donor devices 570 may respond to the request with an acknowledgement 504 offering to share resources with the requesting device. The acknowledgement 504 may include a description of available resources at the donor device 570.

The requesting device 550 then selects a donor device 570 from among the responding donor devices (block 506). The requesting device 550 may then transmit a message 528 to the network indicating the transaction has started. The message 508 may identify the requesting device 550, the selected donor device 570 and the requested resources. The requesting device 550 then uses the resources made available by the donor device 570 (block 514).

Once the requesting device 550 has finished using the resources provided by the donor device 570, the requesting device 550 transmits a message 516 to the network 560 indicating that the transaction is complete. The message 516 includes a ledger entry 525 identifying the requesting device 550, the donor device 570 and the shared resources.

The donor device 570 also sends a message 530 to the network 560 confirming that the transaction is complete. Upon receiving the messages 516, 530 from the requesting device 550 and the donor device 570, the participating devices in the network 560 validate the ledger entry 525 and add it to the DTL (block 520).

Figure 6:
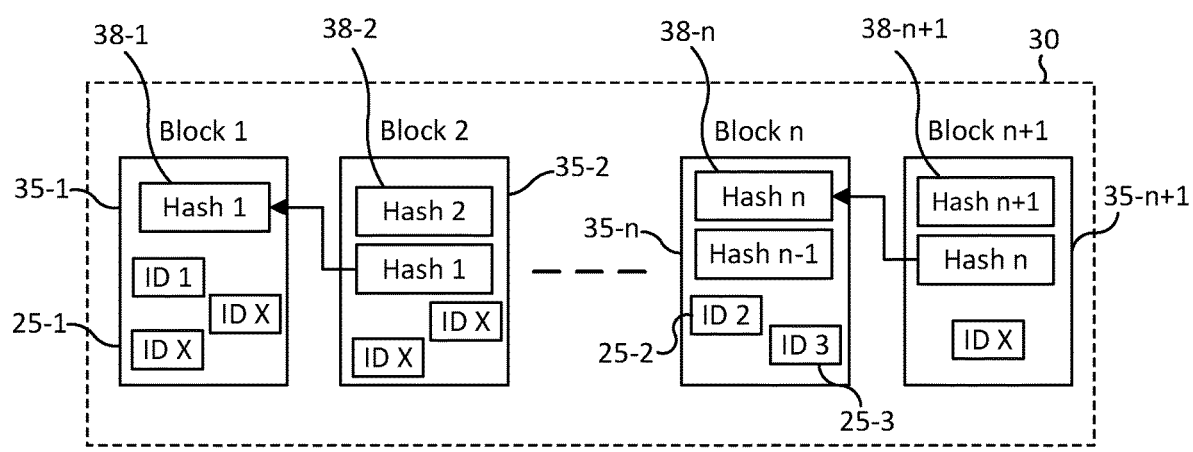
FIG. 6 illustrates an example format of a blockchain that can be used as a distributed transaction ledger in accordance with some embodiments of the inventive concepts.

An example structure of a distributed transaction ledger (DTL) 30 is illustrated in FIG. 6. In some embodiments, a copy of the DTL 30 may be stored by each participating device in the network. In other embodiments, devices may only store a portion of the DTL 30, or a digest of the DTL 30. As shown in FIG. 6, the DTL may be provided as a blockchain, that is, a chain of linked blocks 35-1, 35-2, etc. Each of the linked blocks may be identified by a sequential block number, e.g., Block 1, Block 2, ..., Block n, Block n+1, ... as shown in FIG. 6. Each of the blocks includes a plurality of transactions 38-1, 38-2, etc.

Transactions in the DTL 30 are periodically grouped into blocks which are signed by the generating entity and linked to previous blocks to create a tamper-resistant blockchain. As will be explained below, because the DTL 30 is shared among all participating devices, the contents of the DTL 30 cannot be easily modified retroactively.

The DTL 30 includes a plurality of blocks 35-1, 35-2, etc., each of which includes a plurality of transaction records 25-1, 25-2, etc., that were generated by the participating devices and that correspond to resource sharing transactions. Once a sufficient number of transactions has been accumulated, a participating entity compiles the transactions into a block and calculates a hash 38-1 of the collected transactions. As noted above, the hash value is a fixed length value that is uniquely associated with the input, which in this case is the group of transactions in the block. The block includes the transactions and the hash value, and is given a block number, e.g., Block 1, Block 2, etc. The size of a block may be arbitrary in that there may be no upper or lower limit on the size of a block. For example, a block may include only one transaction record 25 or multiple transaction records. In some embodiments, however, there may be an upper limit on the size of the blocks to limit memory/buffer requirements.

In some embodiments, the system may be configured to generate one block in a given time period regardless of the number of records available to be placed into a block. For example, the system may be configured to generate one block every n seconds. In some embodiments, the system may be configured to generate at least one block every n seconds. Transactions received by a participating entity may be queued, and a block may be generated when (i) a sufficient number of transactions are ready to be placed into a block or (ii) after a predetermined time period has elapsed.

Still referring to FIG. 6, each block after the first block also includes the hash value of the previous block as part of its structure. Thus, for example, Block 2 includes the hash value, Hash 1, of Block 1. When the hash value of Block 2 is calculated, the hash value Hash 1 of Block 1 is included in the block. Thus, the hash value of Block 2 depends in part on the hash value of Block 1. In this way, any alteration of Block 1 will invalidate Block 2, since the hash of Block 1 will no longer be valid.

As more and more blocks are added to the DTL 30, the chain of hash dependencies grows. For example, because each block includes the hash of the previous blocks, all of the blocks become dependent on one another, so that a modification to any block will invalidate all subsequent blocks. In this way, any attempt to modify a previous transaction may be detected.

Figure 7:
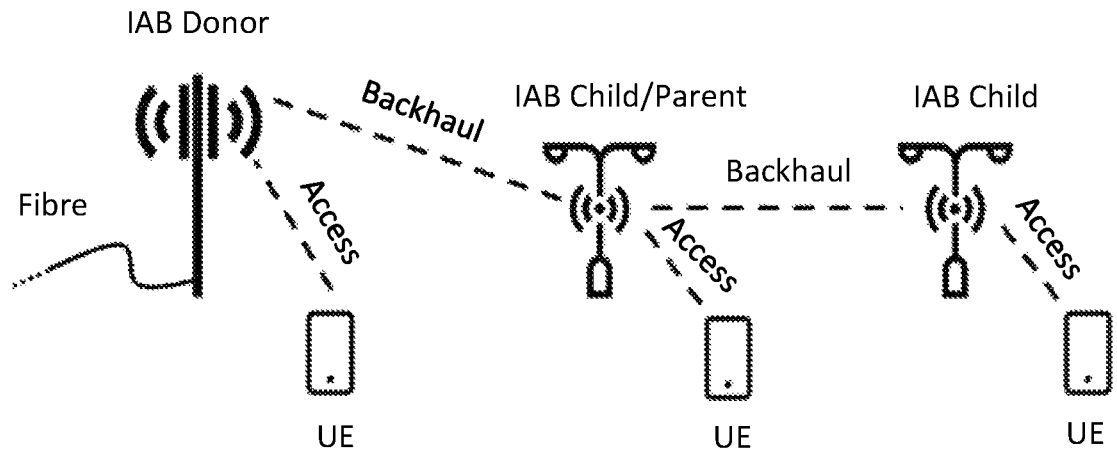
FIGS. 7 and 8 are block diagrams that illustrate example use cases of embodiments of the inventive concepts.

FIG. 7 illustrates a first potential use case of systems/methods according to some embodiments. In particular, FIG. 7 illustrates an Integrated Access and Backhaul (IAB) network including an IAB donor node, and IAB child/parent node and an IAB child node that are connected via b backhaul links. Each of these nodes may serve one or more UEs via access links. In some wireless network scenarios, street sites can be used to assist base stations and combat coverage or capacity problems. In an Integrated Access and Backhaul (IAB) network as shown in FIG. 7, some of the network access nodes are connected to the core network via one or multiple wireless hops. Without the need of running fiber cables to every street site, IAB enables fast and flexible street-level deployment of 5G NR. In these scenarios, resources (frequency bands) may be shared among access nodes, and the right to use them may be exchanged to establish multiple wireless hops. A cooperative communication system as described herein may provide a distributed and scalable mechanism to keep track of the exchanged resources among access nodes in IAB networks.

Figure 8:
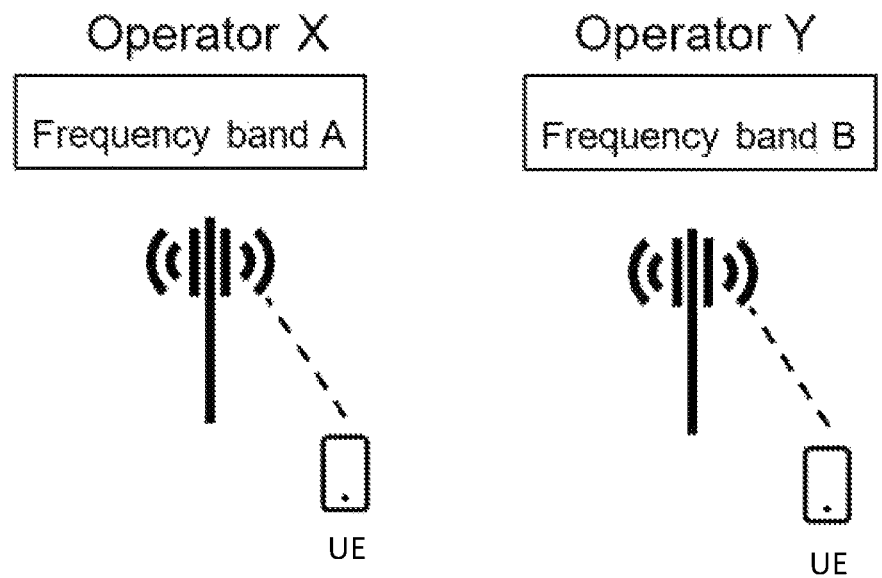

FIG. 8 illustrates a second potential use case of systems/methods according to some embodiments. In particular, FIG. 8 illustrates a multi-carrier environment in which different wireless network operators (Operator X and Operator Y) operate wireless networks over different licensed frequency bands (frequency band A and frequency band B). In some wireless network scenarios, base stations from different operators may need to cooperate by sharing part of their spectrum for a limited time to handle the short-term capacity need in their network. For example, as shown in FIG. 8, the base station from Operator X may need some capacity boost if frequency band A is fully occupied. Therefore, it can send a request to Operator Y to handover part of its available frequency band B for limited time. The exchange of the right to use these frequency bands need to be recorded, for example, for billing purposes. Some embodiments described herein can be advantageously applied in this scenario.

Figure 9:
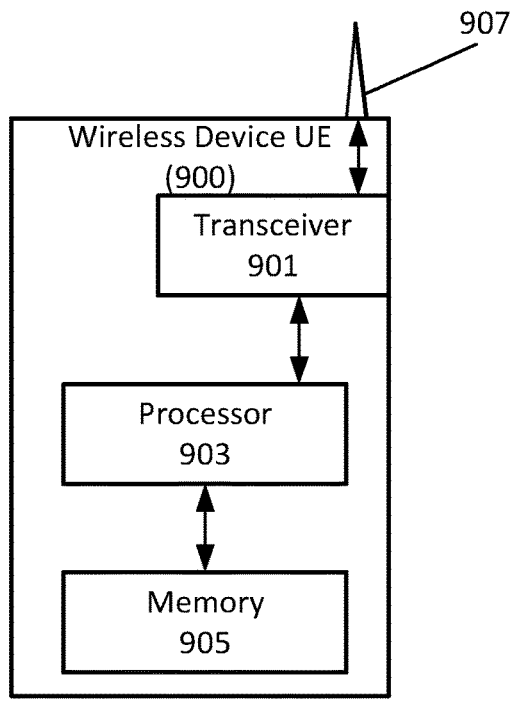
FIG. 9 is a block diagram illustrating a user equipment node according to some embodiments of the inventive concepts.

FIG. 9 is a block diagram illustrating elements of a UE 900 of a communication system. As shown, the UE may include a wireless transceiver circuit 902 for providing a wireless communication interface with a network. The UE 900 may also include a processor circuit 903 (also referred to as a processor) coupled to the transceiver circuit 902 and the wireless transceiver circuit 902, and a memory circuit 905 (also referred to as memory) coupled to the processor circuit. The memory circuit 905 may include computer readable program code that when executed by the processor circuit 903 causes the processor circuit to perform operations according to embodiments disclosed herein. According to other embodiments, processor circuit 903 may be defined to include memory so that a separate memory circuit is not required.

As discussed herein, operations of the UE may be performed by processor 903 and/or the wireless transceiver circuit 902. For example, the processor 903 may control the wireless transceiver circuit 902 to transmit communications to a network node 1000. Moreover, modules may be stored in memory 905, and these modules may provide instructions so that when instructions of a module are executed by processor 903, processor 903 performs respective operations (e.g., operations discussed herein with respect to Example Embodiments).

Figure 10:
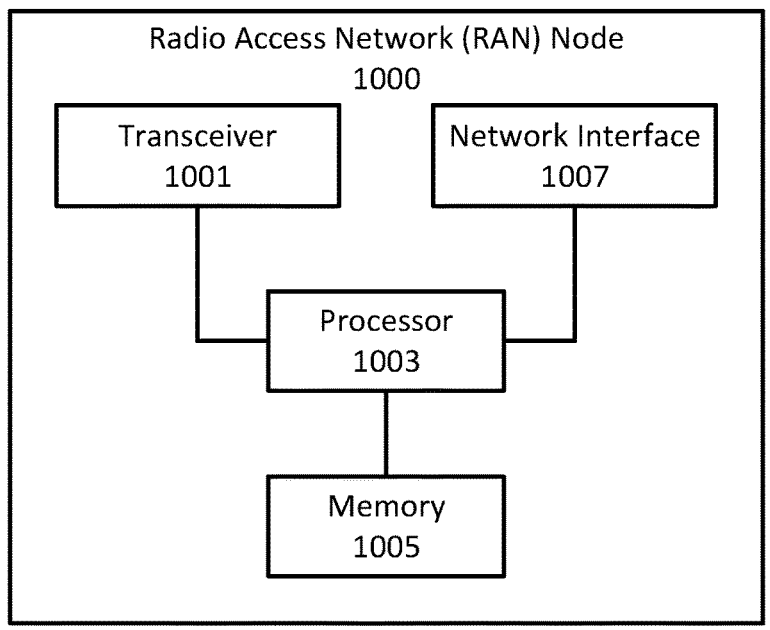
FIG. 10 is a block diagram illustrating a radio access network node according to some embodiments of the inventive concepts.

FIG. 10 is a block diagram illustrating elements of a radio access network (RAN) node 1000 of a communication system. For example, the network node 1000 may implement a gNodeB or eNodeB.

As shown, the network node may include a network interface circuit 1007 (also referred to as a network interface) configured to provide communications with other nodes (e.g., with other base stations, RAN nodes and/or core network nodes) of the communication network. The network node 1000 may also include a wireless transceiver circuit 1002 for providing a wireless communication interface with UEs. The network node 1000 may also include a processor circuit 1003 (also referred to as a processor) coupled to the transceiver circuit 1002 and the network interface 1007, and a memory circuit 1005 (also referred to as memory) coupled to the processor circuit. The memory circuit 1005 may include computer readable program code that when executed by the processor circuit 1003 causes the processor circuit to perform operations according to embodiments disclosed herein. According to other embodiments, processor circuit 1003 may be defined to include memory so that a separate memory circuit is not required.

As discussed herein, operations of the network node may be performed by processor 1003, the wireless transceiver circuit 1002 and/or the network interface 1007. For example, the processor 1003 may control the network interface 1007 to transmit communications through network interface 1007 to one or more other network nodes and/or to receive communications through network interface from one or more other network nodes. Moreover, modules may be stored in memory 1005, and these modules may provide instructions so that when instructions of a module are executed by processor 1003, processor 1003 performs respective operations (e.g., operations discussed herein with respect to Example Embodiments).

Figure 11:
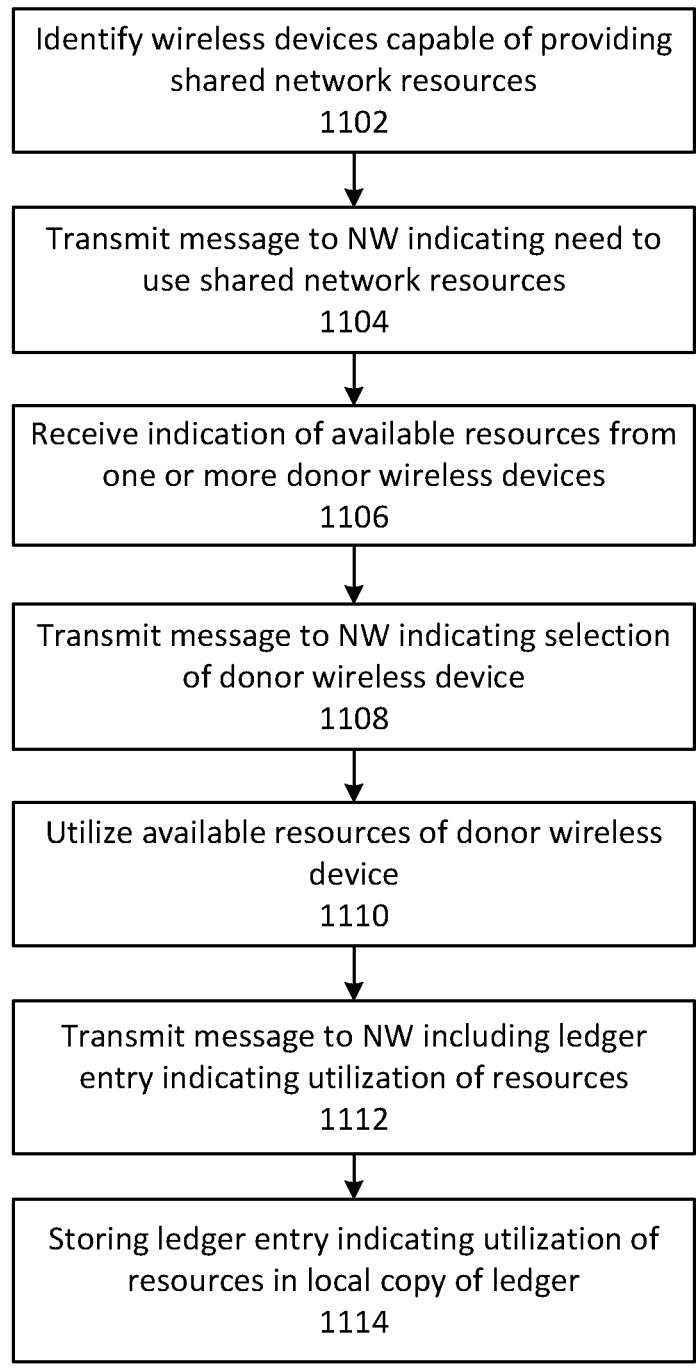
FIGS. 11 to 13 are a flowcharts illustrating operations of a wireless communication device according to some embodiments of the inventive concepts.

FIG. 11 illustrates a method of operating a first wireless communication device in a communication network. Referring to FIGS. 5A, 5B and 11, the method includes transmitting (block 1104) a first message toward a plurality of wireless devices, the first message indicating a need of the first wireless communication device to use shared network resources, receiving (block 1106) an indication from a second wireless device that it has available resources, utilizing (block 1110) the available resources of the second wireless device, transmitting (block 1112) a second message toward the plurality of wireless devices, the second message comprising an entry (517, 525) for inclusion in a distributed transaction ledger of utilized resources that is shared among the plurality of wireless devices, the entry indicating utilization of the available resources of the second wireless device by the first wireless communication device, and storing (block 1114) the entry in a local copy of the distributed transaction ledger.

The entry for inclusion in the distributed transaction ledger identifies the first wireless communication device, the second wireless device, and the available resources provided by the second wireless device.

The entry may include a cryptographic hash of a value previously included in the distributed transaction ledger. The value previously included in the distributed transaction ledger may include a cryptographic hash of a previous entry in the ledger.

The shared network resources may include battery power, processing capacity, memory and/or wireless bandwidth. The first message may identify an amount and type of shared network resources that are requested.

The first message may identify a quantity of a payment token that is offered in exchange for providing the shared network resources that are requested, and the entry for inclusion in the distributed transaction ledger transfers the quantity of the payment token to the second wireless device.

The method may further include transmitting (block 1108) a third message (508) to the plurality of wireless devices indicating selection of the second wireless device to provide the shared network resources in response to receiving the indication from the second wireless device that it has available resources. The third message may include a second entry (515) for inclusion in the distributed transaction ledger of utilized resources identifying the second wireless device and the available resources indicated by the second wireless device.

The method may further include identifying (block 1102) the plurality of wireless devices from among a plurality of candidate wireless devices by determining, from the distributed transaction ledger, which of the plurality of candidate wireless devices has the capability of providing the shared network resources needed by the first wireless communication device.

The method may further include validating the entry prior to storing the entry in the local copy of the distributed transaction ledger.

Figure 12:
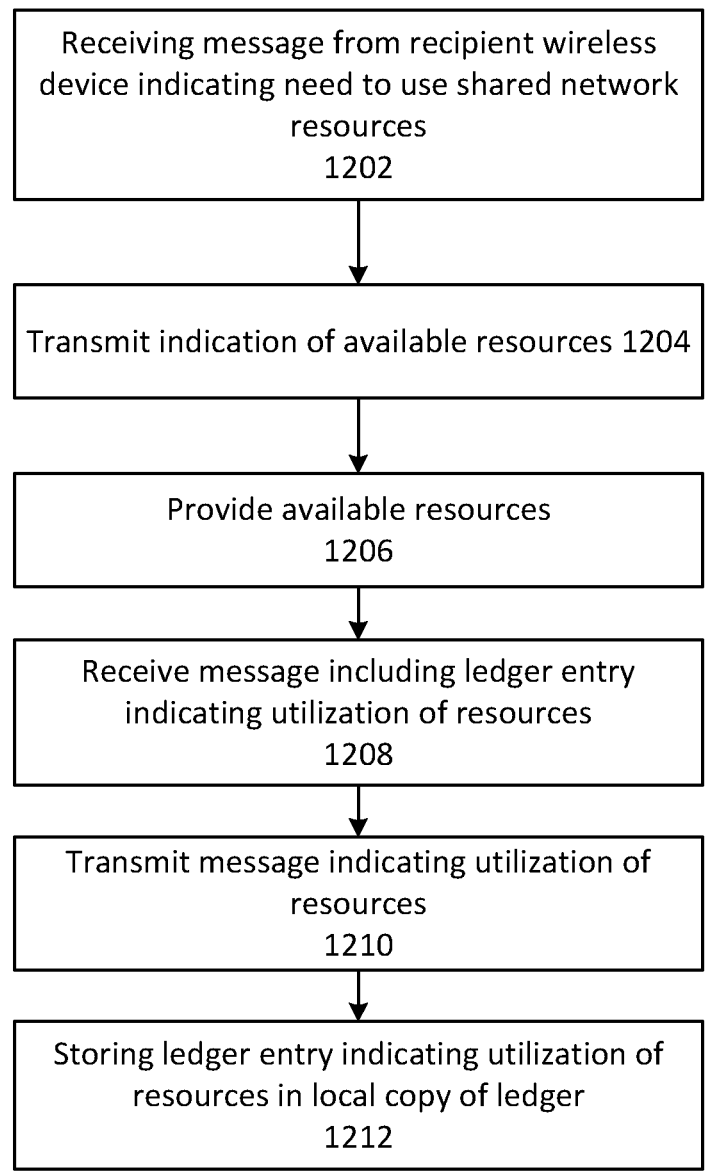

FIG. 12 is a flowchart of operations that may be performed by a wireless device that participates in cooperative communication system. Referring to FIGS. 5A, 5B and 12, the method includes receiving (block 1202) a first message from a first wireless device indicating a need of the first wireless device to use shared network resources, transmitting (block 1204) a message to the first wireless device indicating that the second wireless has available resources, providing (block 1206) the available resources to the first wireless device, receiving (block 1208) a second message (516) from the first wireless device, the second message comprising an entry (517, 225) for inclusion in a distributed transaction ledger of utilized resources that is shared among a plurality of wireless devices, the entry indicating utilization of the available resources of the second wireless device by the first wireless device, and storing (block 1212) the entry in a local copy of the distributed transaction ledger.

The method may further include receiving a third message (508) indicating selection of the second wireless device to provide the shared network resources.

The entry for inclusion in the distributed transaction ledger may identify the first wireless communication device, the second wireless device, and the available resources provided by the second wireless device. The entry may include a cryptographic hash of a value previously included in the distributed transaction ledger. The value previously included in the distributed transaction ledger may include a cryptographic hash of a previous entry in the ledger.

The first message may identify an amount and type of shared network resources that are requested and a quantity of a payment token that is offered in exchange for providing the shared network resources that are requested. The entry for inclusion in the distributed transaction ledger may transfer the quantity of the payment token to the second wireless device.

The method may further include validating the entry prior to storing the entry in the local copy of the distributed transaction ledger.

The third message may include a second entry (515) for inclusion in the distributed transaction ledger of utilized resources identifying the second wireless device and the available resources indicated by the second wireless device.

The method may further include, after providing the available resources to the first wireless device, transmitting (1210) a message (290) to the plurality of wireless devices indicating that the available resources have been provided to the first wireless device.

Figure 13:
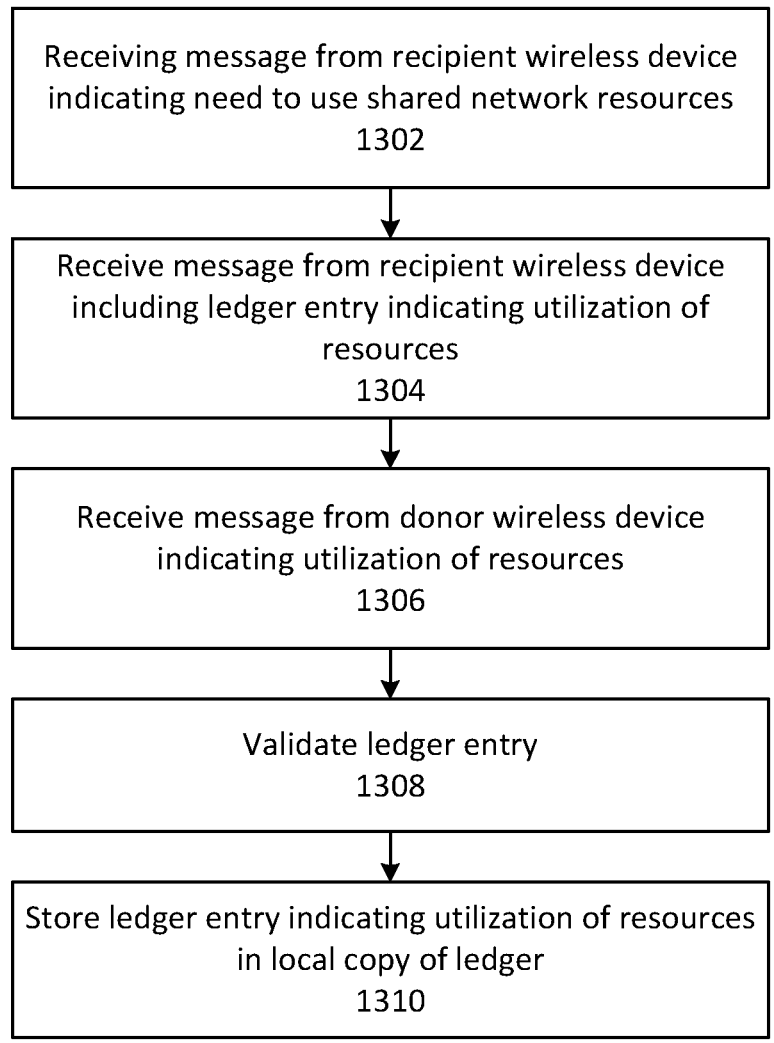

FIG. 13 is a flowchart of operations that may be performed by a wireless device that participates in cooperative communication system. Referring to FIGS. 5A, 5B and 13, the method includes receiving (block 1302) a first message from a first wireless device indicating a need of the first wireless device to use shared network resources, receiving (block 1304) a second message (516) from the first wireless device, the second message comprising an entry (517, 225) for inclusion in a distributed transaction ledger of utilized resources that is shared among a plurality of wireless devices, the entry indicating utilization of resources of a second wireless device by the first wireless device, and storing (block 1310) the entry in a local copy of the distributed transaction ledger.

The method may further include receiving a third message (508) indicating selection of the second wireless device to provide the shared network resources.

The entry for inclusion in the distributed transaction ledger may identify the first wireless communication device, the second wireless device, and the resources of the second wireless device. The entry may include a cryptographic hash of a value previously included in the distributed transaction ledger. The value previously included in the distributed transaction ledger may include a cryptographic hash of a previous entry in the ledger.

The first message may identify an amount and type of shared network resources that are requested.

The first message may identify a quantity of a payment token that is offered in exchange for providing the shared network resources that are requested. The entry for inclusion in the distributed transaction ledger may transfer the quantity of the payment token to the second wireless device.

The method may further include validating the entry prior to storing the entry in the local copy of the distributed transaction ledger.

The third message may include a second entry (515) for inclusion in the distributed transaction ledger of utilized resources identifying the second wireless device and the resources of the second wireless device.

The method may further include receiving (block 1306) a message (290) from the second wireless device indicating that the resources have been provided to the first wireless device.

Referring to FIGS. 9 and 10, a communication device (900, 1000) according to some embodiments includes processing circuitry (903, 1003), and a memory (905, 1005) coupled with the processing circuitry. The memory includes instructions that when executed by the processing circuitry causes the communication device to perform operations as illustrated in FIGS. 11, 12 and 13. Some embodiments provide a communication device (900, 1000) adapted to perform operations as illustrated in FIGS. 11, 12 and 13. Some embodiments provide a non-transitory medium storing computer program code to be executed by processing circuitry (903, 1003) of a communication device (900, 1000), whereby execution of the program code causes the communication device (900, 1000) to perform operations as illustrated in FIGS. 11, 12 and 13.

Explanations are provided below for abbreviations that are mentioned in the present disclosure.

Abbreviation Explanation
 DL Downlink
 UL Uplink
 DTL Distributed Transaction Ledger
 IAB Integrated Access and Backhaul
 IoT Internet of Things
 MTC Machine Type Communication
 UE User Equipment
 gNB gNodeB
 RAN Radio Access Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 14:
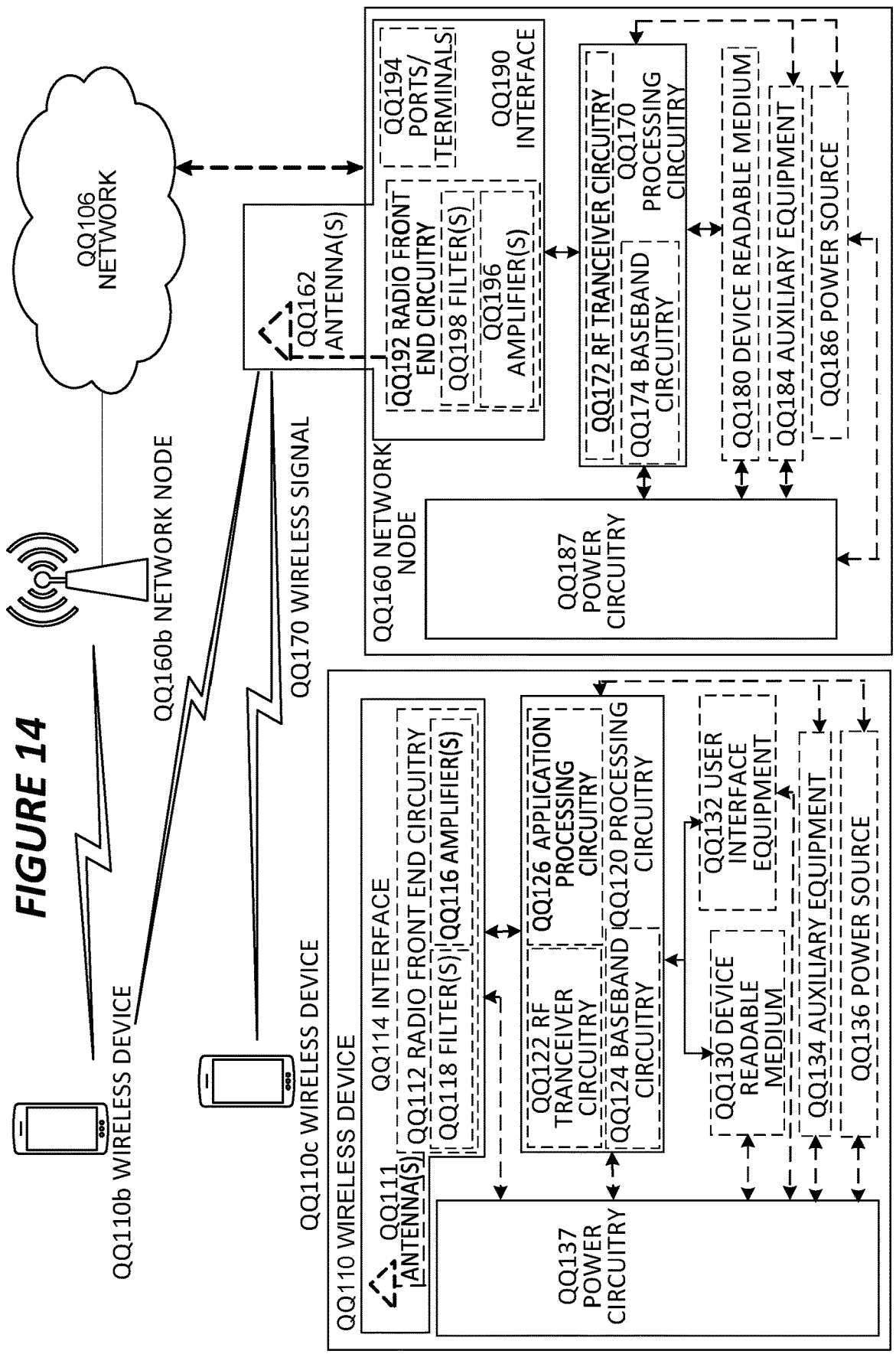
FIG. 14 is a block diagram of a wireless network in accordance with some embodiments.

FIG. 14: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SM LCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174.

In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ192 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ112 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
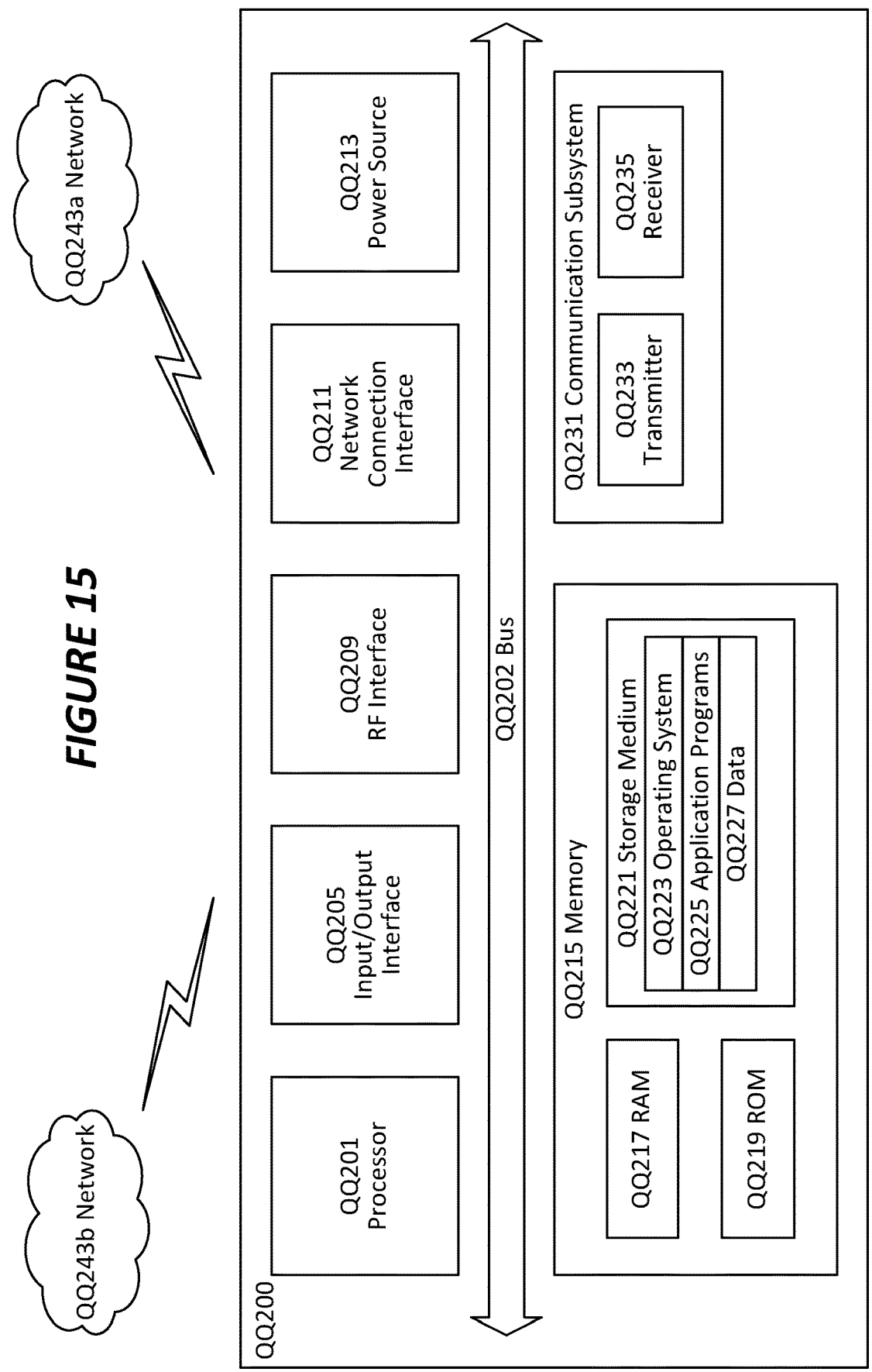
FIG. 15 is a block diagram of a user equipment in accordance with some embodiments

FIG. 15: User Equipment in accordance with some embodiments

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ213, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
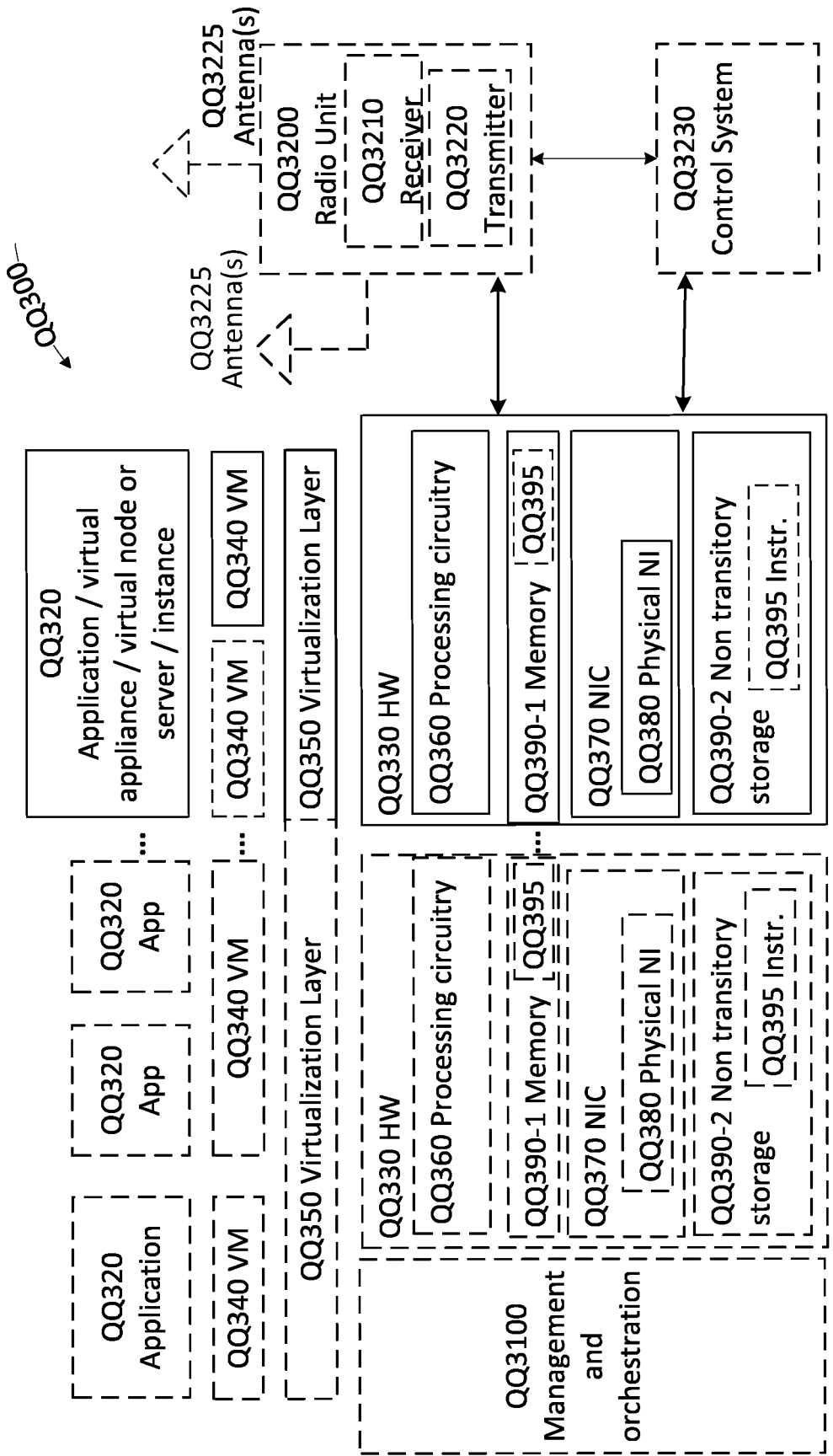
FIG. 16 is a block diagram of a virtualization environment in accordance with some embodiments.

FIG. 16: Virtualization environment in accordance with some embodiments

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 17:
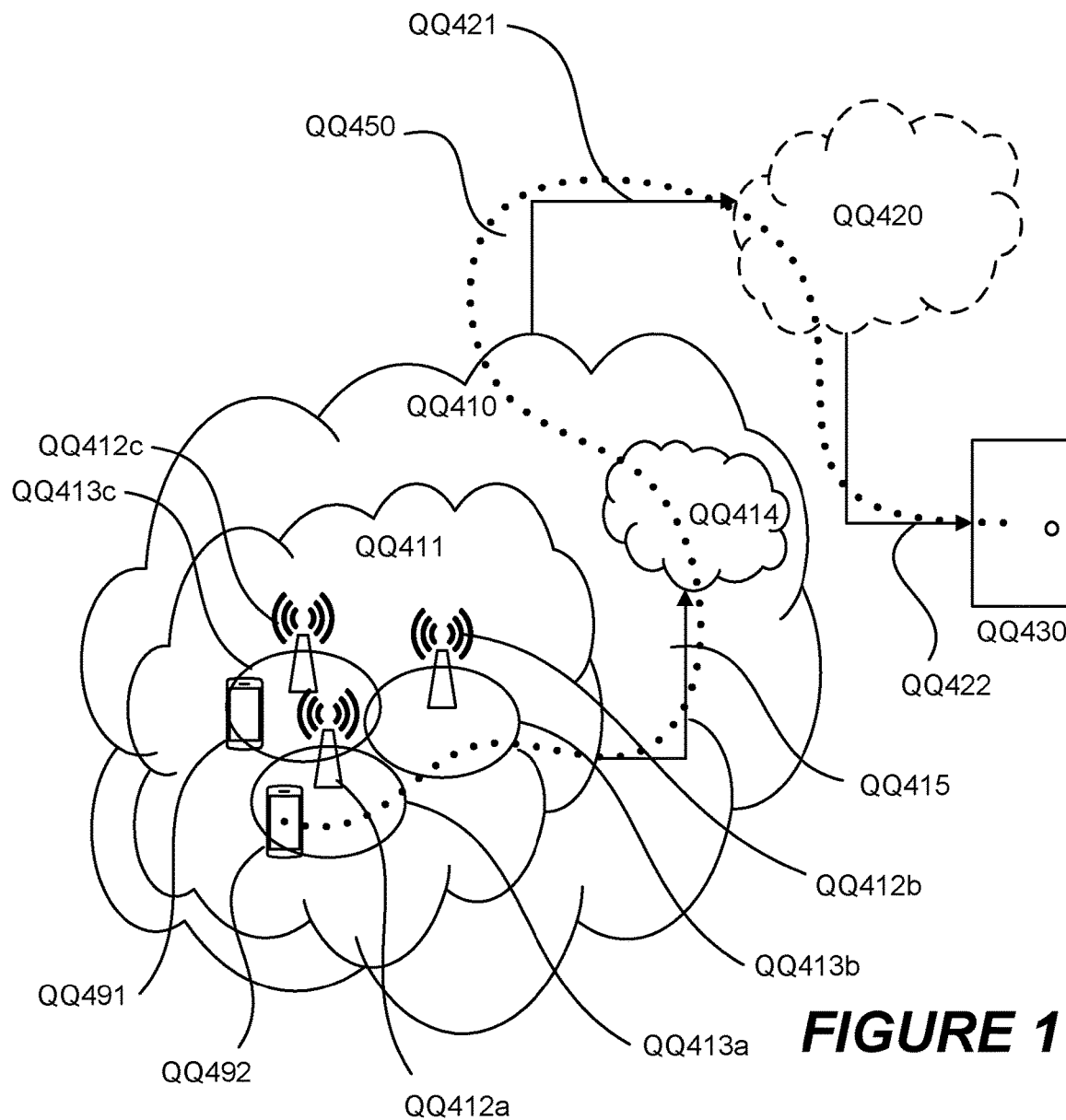
FIG. 17 is a block diagram of a telecommunication network connected via an intermediate network to a host computer in accordance with some embodiments.

FIG. 17: Telecommunication network connected via an intermediate network to a host computer in accordance with some embodiments.

With reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 18:
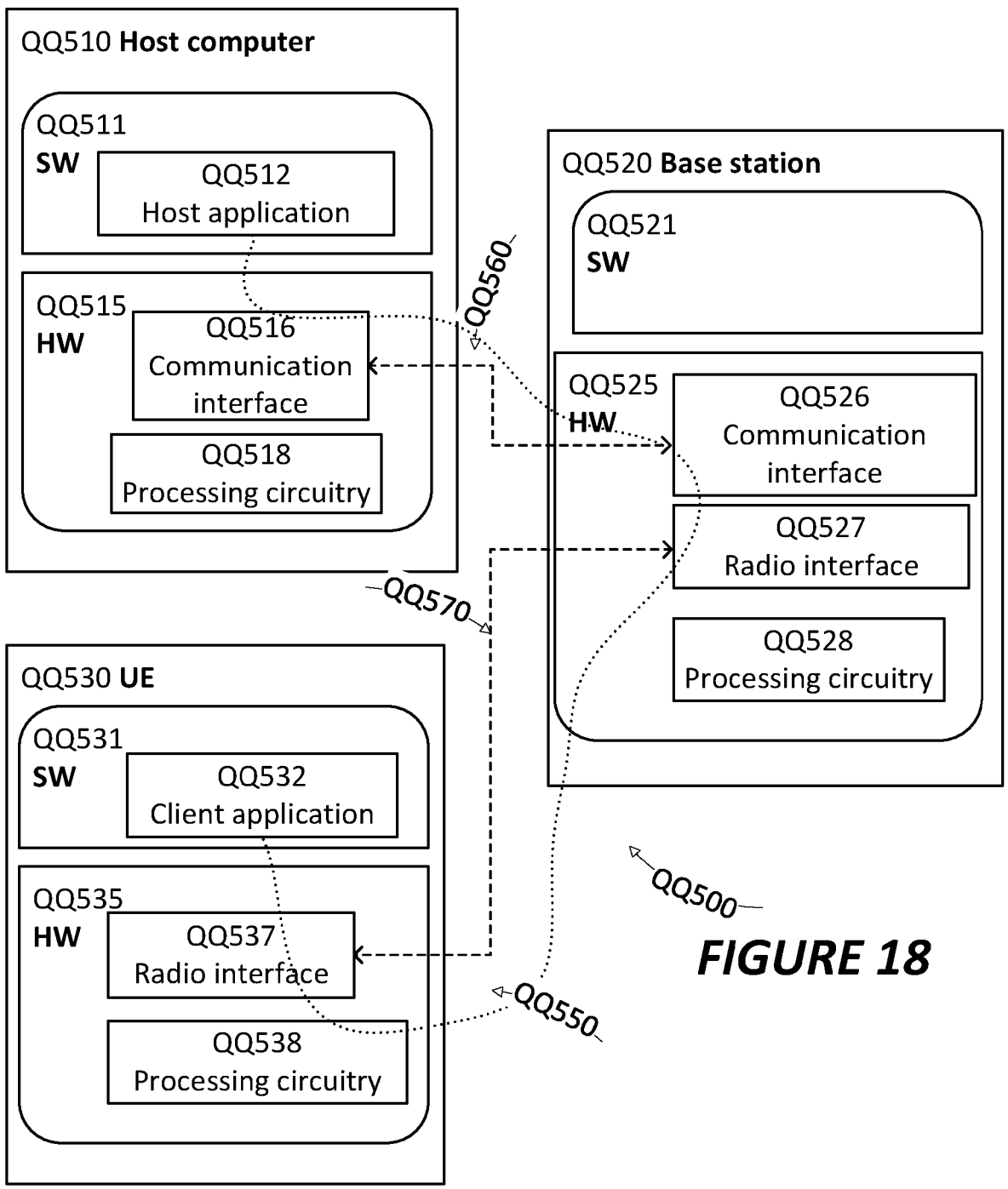
FIG. 18 is a block diagram of a host computer communicating via a base station with a user equipment over a partially wireless connection in accordance with some embodiments.

FIG. 18: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 19:
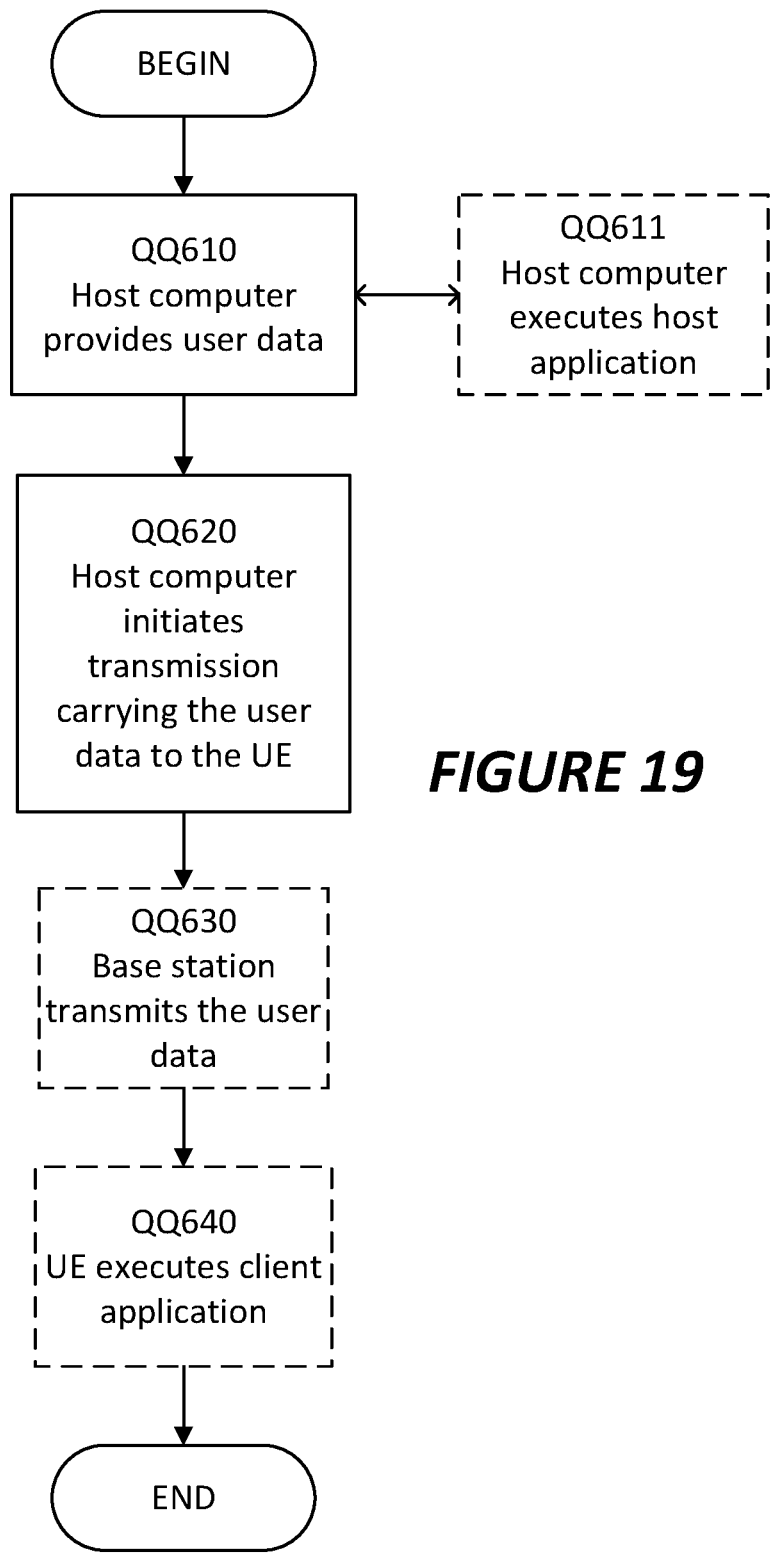
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 20:
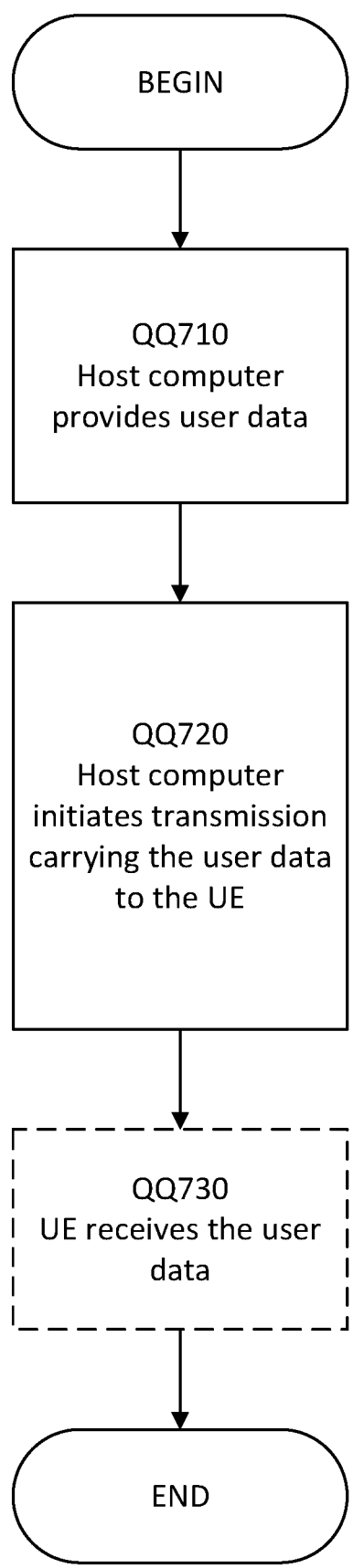
FIG. 20 is a block diagram of methods implemented in a communication system including a host computer, a base station, and a user equipment in accordance with some embodiments.

FIG. 20: Methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 21:
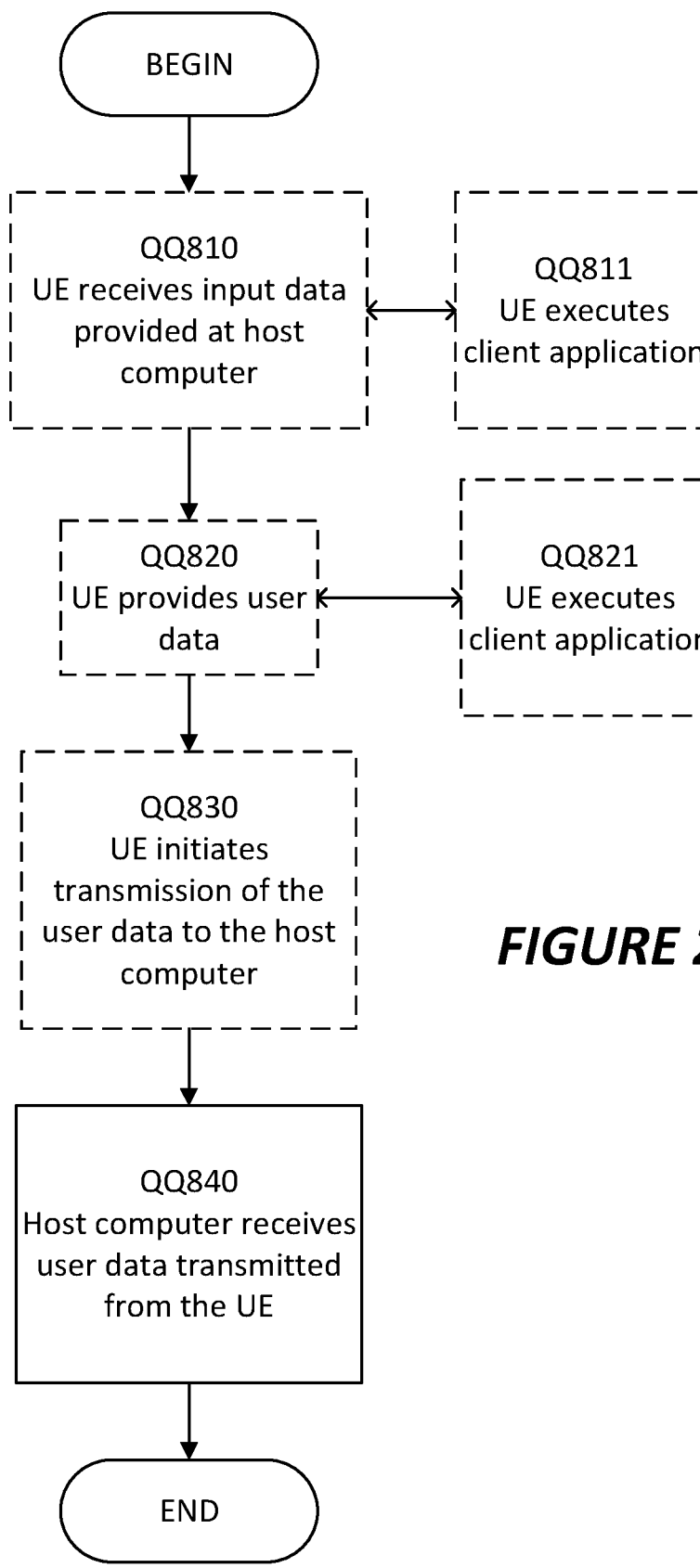
FIG. 21 is a block diagram of methods implemented in a communication system including a host computer, a base station, and a user equipment in accordance with some embodiments.

FIG. 21: Methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 22:
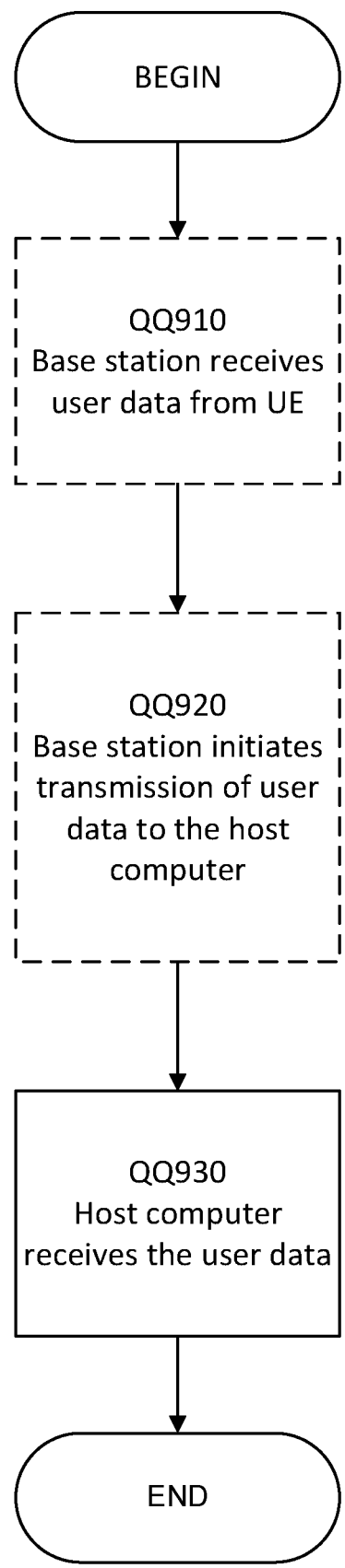
FIG. 22 is a block diagram of methods implemented in a communication system including a host computer, a base station, and a user equipment in accordance with some embodiments.

FIG. 22: Methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a first wireless device, comprising:
    transmitting a first message toward one or more wireless devices including a second wireless device, the first message indicating a need of the first wireless device to use shared network resources, the first message identifying an amount and type of shared network resources that are requested;
    receiving an indication from the second wireless device that it has available resources;
    utilizing the available resources of the second wireless device;
    transmitting a second message toward the one or more wireless devices, the second message comprising an entry for inclusion in a distributed transaction ledger of utilized resources that is shared among the one or more wireless devices, the entry indicating utilization of the available resources of the second wireless device by the first wireless device; and
    storing the entry in a local copy of the distributed transaction ledger.

2. The method of claim 1, further comprising:
    transmitting a third message to the one or more wireless devices indicating selection of the second wireless device to provide the shared network resources in response to receiving the indication from the second wireless device that it has available resources.

3. The method of claim 2, wherein the third message includes a second entry for inclusion in the distributed transaction ledger of utilized resources identifying the second wireless device and the available resources indicated by the second wireless device.

4. The method of claim 1, wherein the entry comprises a cryptographic hash of a value previously included in the distributed transaction ledger.

5. The method of claim 1, wherein the type of shared network resources is wireless spectrum resources.

6. The method of claim 1, wherein wireless spectrum resources include uplink resources, or downlink resources, or sidelink resources.

7. The method of claim 1, further comprising:
identifying the one or more wireless devices from among one or more candidate wireless devices by determining, from the distributed transaction ledger, which of the one or more candidate wireless devices has the capability of providing the shared network resources needed by the first wireless device.

8. The method of claim 1, wherein the entry for inclusion in the distributed transaction ledger identifies the first wireless device, the second wireless device, and the available resources provided by the second wireless device.

9. The method of claim 1, wherein the first message identifies a quantity of a payment token that is offered in exchange for providing the shared network resources that are requested; and
wherein the entry for inclusion in the distributed transaction ledger transfers the quantity of the payment token to the second wireless device.

10. A communication device comprising:
processing circuitry; and
memory coupled with the processing circuitry, the memory including instructions that when executed by the processing circuitry causes the communication device to:
transmit a first message toward one or more wireless devices including a second wireless device, the first message indicating a need of the first wireless communication device to use shared network resources, the first message identifying an amount and type of shared network resources that are requested;
receive an indication from the second wireless device that it has available resources;
utilize the available resources of the second wireless device;
transmit a second message toward the one or more wireless devices, the second message comprising an entry for inclusion in a distributed transaction ledger of utilized resources that is shared among the one or more wireless devices, the entry indicating utilization of the available resources of the second wireless device by the first wireless communication device; and
store the entry in a local copy of the distributed transaction ledger.

11. A method of operating a second wireless device, comprising:
receiving a first message from a first wireless device indicating a need of the first wireless device to use shared network resources, the first message identifying an amount and type of shared network resources that are requested;
transmitting a message to the first wireless device indicating that the second wireless has available resources;
providing the available resources to the first wireless device;
receiving a second message from the first wireless device, the second message comprising an entry for inclusion in a distributed transaction ledger of utilized resources that is shared among a one or more wireless devices, the entry indicating utilization of the available resources of the second wireless device by the first wireless device; and
storing the entry in a local copy of the distributed transaction ledger.

12. The method of claim 11, wherein the first message identifies a quantity of a payment token that is offered in exchange for providing the shared network resources that are requested; and
wherein the entry for inclusion in the distributed transaction ledger transfers the quantity of the payment token to the second wireless device.

13. The method of claim 11, further comprising:
after providing the available resources to the first wireless device, transmitting a message to the one or more wireless devices indicating that the available resources have been provided to the first wireless device.

14. The method of claim 11, further comprising:
receiving a third message indicating selection of the second wireless device to provide the shared network resources.

15. The method of claim 14, wherein the third message includes a second entry for inclusion in the distributed transaction ledger of utilized resources identifying the second wireless device and the available resources indicated by the second wireless device.

16. The method of claim 11, wherein the entry comprises a cryptographic hash of a value previously included in the distributed transaction ledger.

17. The method of claim 11, wherein the type of shared network resources is wireless spectrum resources and include uplink resources, or downlink resources, or sidelink resources.

18. The method of type of shared network resources identified in the first message is selected from a plurality of types of shared network resources, the plurality of types of shared network resources including:
wireless spectrum resources; and
at least one of battery power, processing capacity, memory resources.

19. The method of claim 11, wherein the entry for inclusion in the distributed transaction ledger identifies the first wireless device, the second wireless device, and the available resources provided by the second wireless device.

* * * * *